March 11, 1947.   C. N. HICKMAN   2,417,076
HIGH SPEED CAMERA
Filed May 30, 1944   3 Sheets-Sheet 1

INVENTOR
C. N. HICKMAN
BY
*J. F. McEneany*
ATTORNEY

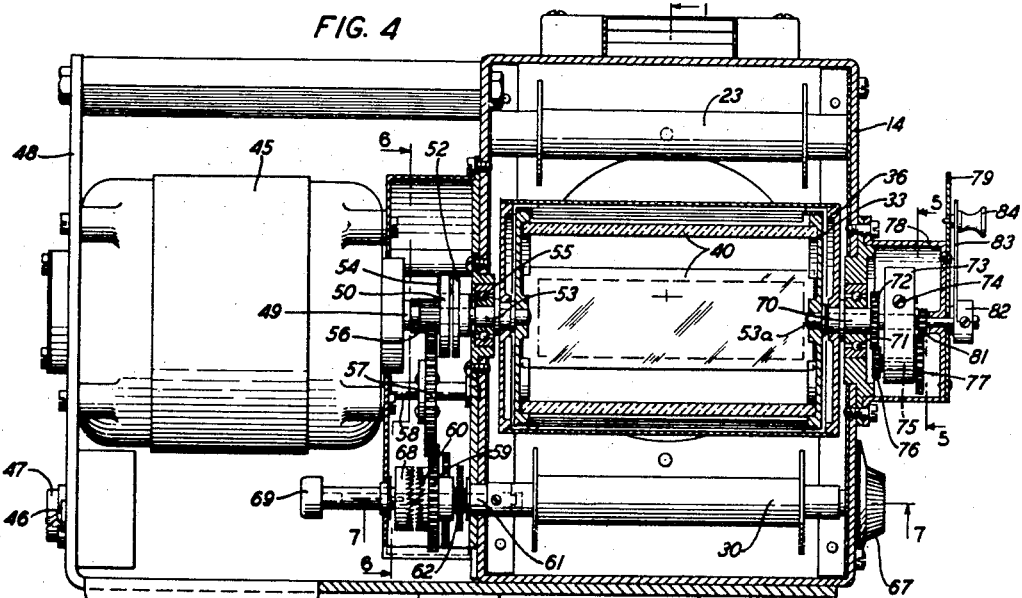

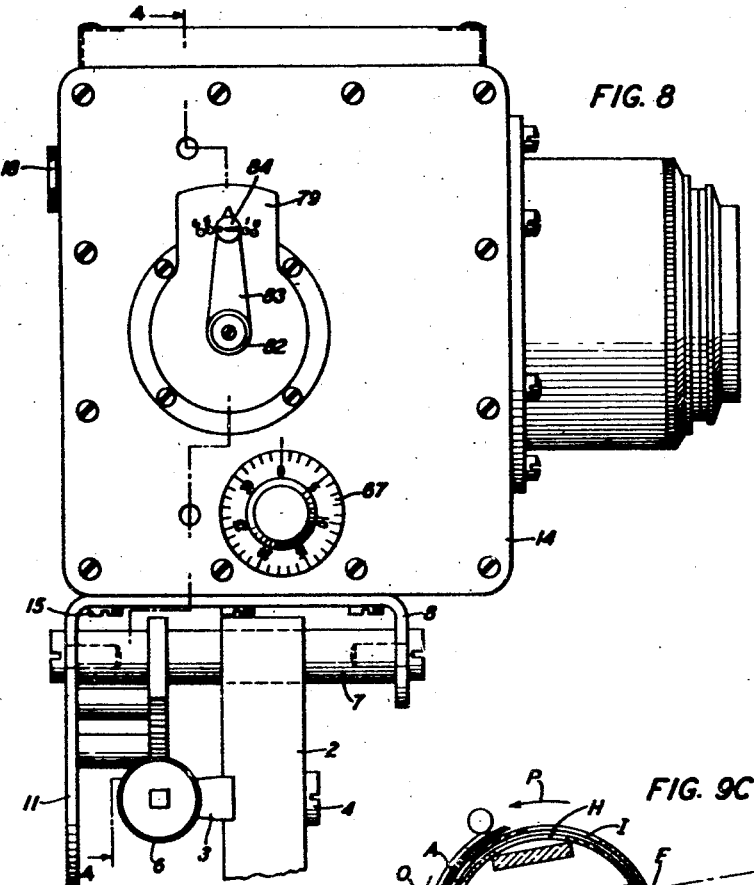
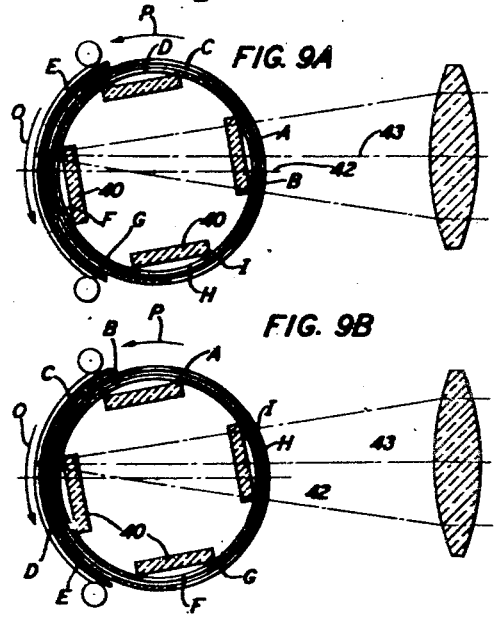
INVENTOR
C. N. HICKMAN
BY
ATTORNEY

Patented Mar. 11, 1947

2,417,076

UNITED STATES PATENT OFFICE 2,417,076

HIGH-SPEED CAMERA

Clarence N. Hickman, Jackson Heights, N. Y., assignor to Bell Telephone Laboratories, Incorporated, New York, N. Y., a corporation of New York Application May 30, 1944, Serial No. 538,063

13 Claims. (Cl. 88—16.8)

This invention relates to cameras and particularly to improvements in high speed cameras designed for use in the study of objects in rapid motion.

It is the object of this invention to provide a relatively inexpensive, compact camera incorporating novel features permitting its use in the study of objects in rapid motion in approximately straight lines, such as projectiles and reciprocating parts of machinery.

It is a further object of this invention to provide a camera in which the picture frames recorded on a film are limited in height to a dimension just sufficient to include the object to be photographed in successive positions as it moves transversely of the film and in which the time interval between successive picture frames is accurate and constant throughout an exposure series.

It is still a further object of this invention to provide a relatively small, compact tubular light interrupting means for the camera which will, for each exposure, present a narrow opening at the film and an exposure opening at the lens of sufficient width to permit substantially all the light from the lens to pass toward the film.

Another object of this invention is to provide improved means associated with the light interrupting means of the camera to vary the exposure time thereof through wide latitudes.

Use has been made heretofore of a high speed camera in the recording of the movement of an object in rapid motion. In connection with the study of objects in rapid motion in approximately straight lines, for example, in the study of projectile and rocket flights, an important factor in obtaining accuracy of measurement of velocity and acceleration is that the time interval between picture frames be sufficiently accurate and constant throughout an exposure series to permit direct analysis of the velocity, acceleration and orientation of the object at every point in its trajectory. Since the trajectories to be followed are approximately straight, the height of the picture frame recorded on the film may be made very narrow compared to its width so long as this height is sufficient to cover any slight curvature in the trajectory or any slight error in aligning the camera with the trajectory. In high speed cameras in which numerous frames are to be recorded in rapid succession, a reduction in the dimension of the frame longitudinally of the film results in substantial economy of film and, in addition, reduces the motion the film must make in moving from one frame to the next. An exposure series in which the successive frames are closely related accurately as to time interval between frames gives obvious advantages in velocity and acceleration studies of the object in motion.

In high speed cameras designed heretofore for the purpose of recording the motion of projectiles and rockets in an exposure series of long narrow picture frames on the film, it was found necessary to employ a light interrupting means or shutter comprising a relatively large rotating drum having a number of spaced exposure openings on its periphery, the exposure openings having substantially the dimensions of the picture frame to be recorded. As this shutter mechanism must interrupt the light between the lens and the film it was necessary to place the film driving means and the apertured framing means wholly within the shutter drum. This camera design necessitates the use of a relatively large shutter drum which, in turn, increases the cost of construction and the over-all size of the camera to an extent which limits its portability. Another disadvantage in connection with the use of the high speed camera designed heretofore lies in the fact that an auxiliary timing device is necessary in order to accurately determine the time interval between successive frames recorded on the film.

Applicant conceived the idea that the over-all size could be greatly decreased and a less costly construction obtained in a camera for this purpose if use is made of a light interrupting means between lens and film in the form of a small diameter tubular shutter having a series of diametrically opposed exposure slots and rotatable at an angular speed sufficient to produce the required number of exposures per second.

The problem, however, presented itself of obtaining a tubular type shutter in which the slot on the film side would be narrow and simultaneously obtain an opening on the lens side of sufficient size to insure uninterrupted passage of the light from the lens.

This problem was solved by applicant by employing two concentric tubular shutters, one of which is provided with an even number of diametrically opposed exposure slots each of which is wide enough to pass the entire light from the lens when adjacent thereto and the other of which is provided with a greater odd number of exposure slots which are equal in width to the exposure slots in the first shutter. The concentric shutters are rotatable in the same direction with the shutter having the greater number of slots rotating at a fraction of the speed of the shutter having the smaller number of exposure slots. In a shutter mechanism, in accordance with the invention, the shutter speeds are reciprocally related to the number of exposure slots therein. Thus, in a shutter mechanism having one shutter with four slots and a second shutter with five slots, the first shutter rotates through one-quarter of a complete revolution while the second shutter rotates through one-fifth of a revolution.

It was further conceived by applicant that the exposure time of the camera could be varied through wide latitudes by the provision of means associated with the driving connection between the shutters to vary their phase relation without altering their speed differential.

In a camera constructed in accordance with this invention constantly accurate frame speed or time interval between frames is assured by the use of a synchronous driving motor, thus eliminating the necessity for an auxiliary timing device.

Other objects and novel features of this invention will be apparent from the following description when read in connection with the accompanying drawings, in which:

Fig. 4 is a sectional elevation from the rear of the camera, the section taken on line 4—4 of Fig. 8;

Fig. 5 is a view in section on line 5—5 of Fig. 4 showing the gear coupling between the concentric shutters of the light interrupting means in accordance with the invention;

Fig. 6 is a view in section on line 6—6 of Fig. 4 showing the gear coupling between the driving motor and the shutter, take-up reel and footage counter of the camera;

Fig. 7 is a view in section on line 7—7 of Fig. 4;

Fig. 8 is a side elevation of the camera showing the relative positions of the footage counter and the means for adjusting the shutter exposure time; and Figs. 9A to 9D inclusive, are views diagrammatically illustrating the relative positions of the concentric tubular shutters for one complete revolution of the inner shutter.

Figure 1:
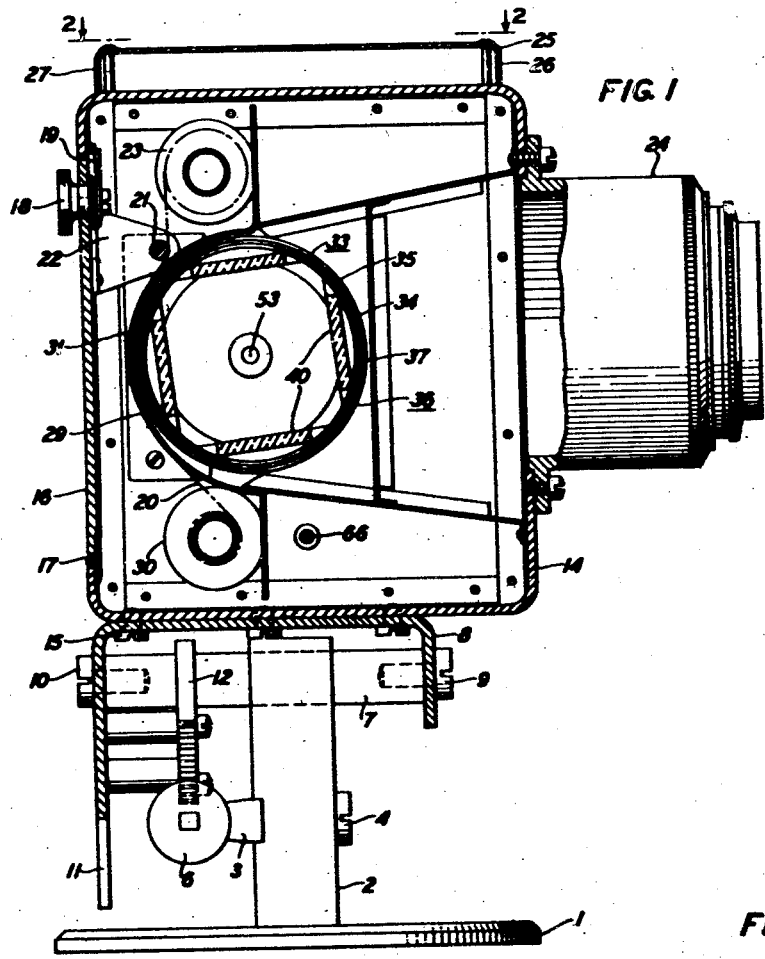
Fig. 1 is an elevation on line 1—1 of Fig. 4 showing the film guiding elements and light interrupting means of a camera in accordance with the invention.

Referring to Fig. 1, numeral 1 indicates a flat circular base which may be placed on a suitable support such as a camera tripod. A standard 2, extending upward from base 1, has a bifurcated element 3 secured thereto by means of machine screw 4. A worm gear 5 (Fig. 4) is rotatably mounted in element 3, as shown, and may be manually rotated by means of knobs 6 located on each end of the gear shaft.

A shaft 7 is rotatably mounted in standard 2 near the upper end thereof. An element 8 is secured to shaft 7 by machine screws 9 and 10. An extension 11 of element 8 forms a sector shaped portion on which markings are placed to indicate the angular position of the camera with respect to the base 1. A worm gear sector 12 is secured to the rotatable assembly including shaft 7 and element 8 in such a manner that it meshes with worm wheel 5. By manual rotation of knob 6, the rotatable camera supporting assembly may be tilted in clockwise and counter-clockwise directions to bring the field of view of the camera in line with the path of movement of the object to be photographed.

A camera housing 14 is secured to the element 8 by means of a plurality of machine screws 15. A door 16, hinged at 17, is provided with a knob 18, operating a latching lever 19 to permit access to the interior of the camera to insert or remove a recording film 20. A rod 21 supported by spaced brackets 22 (one shown) secured to the door 16 provides a guide means for the film from a supply reel 23, causing the film to ride snug against a film gate at the exposure point.

The front of the camera is provided with a lens tube 24 containing the lens element of the camera optical system.

Figure 2:
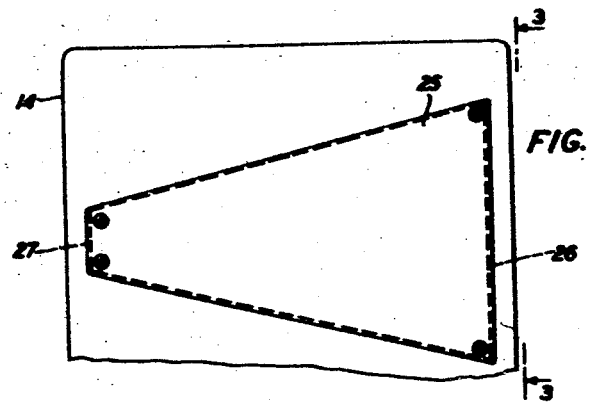
Fig. 2 is a plan view on line 2—2 of Fig. 1 showing the camera view finder.
Figure 3:
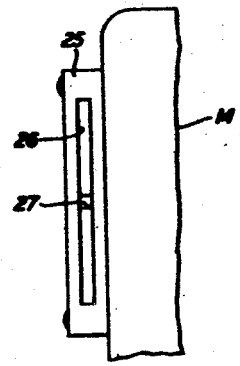
Fig. 3 is an elevation on line 3—3 of Fig. 2.

A view finder 25, mounted on top of housing 14, consists of a shallow box in the form of an isosceles trapezoid with the longer parallel end toward the front of the camera, as shown in Figs. 2 and 3. In the front end there is provided a long narrow slit 26 and at the back end a peep hole 27. The view observed through this finder will be the same as the image to be formed on the film by a framing exposure aperture to be described hereinafter.

The path of film 20 is from supply reel 23, over a curved film gate 29 to a continuously driven take-up reel 30. The film gate 29 is provided with a film framing exposure aperture 31 in line with the optical axis of the lens system. This framing aperture, which is similar in shape to the opening 26 in view finder 25, permits the exposure of the full width of the film but limits the exposure longitudinally of the film to a dimension just sufficient to include the object to be photographed in successive positions as it moves in a straight line transversely of the film. This feature of exposing a minimum longitudinal area of film for each picture or frame results not only in economy of film but also provides a means for securing numerous frames side by side on the same film with obvious advantages for studying the motion of the object photographed.

Between the lens tube 24 and the exposure aperture 31 there is provided a light interrupting means in the form of two concentric tubular elements each provided with different numbers of equal size light admitting slots, the elements being continuously rotatable in the same direction at unequal angular speeds. The exposure slots in the shutters extend over the full length of the shutter transversely of the film. The slot arrangement of the two elements is such that an initial phase relation may be made in which the opening formed on the lens side is substantially equal to the full slot opening whereby the total light from the lens is passed toward the film, while the exposure opening formed on the film side may be quite narrow. By producing and maintaining a proper speed differential between the shutters, this slot relation will be repeated for each exposure.

In Fig. 1, a tubular shutter 33 is provided with four diametrically opposed slots 34. In this particular construction, the slots 34 are each 40 degrees in width while the four light intercepting segments 35 are each 50 degrees in width. An outer concentric tubular shutter 36 is provided with five 40 degree slots 37, evenly spaced around its periphery.

By means to be described hereinafter, the two shutters are rotated in a counter-clockwise direction at unequal angular speeds. The rotation of the two tubular shutters are synchronized so that at regular intervals of four times for each revolution of the inner shutter, the slots open and close a path for light from the lens to the film. In the camera disclosed in the drawings, the inner shutter 33 is driven at 30 revolutions per second and since there are four exposure slots in the shutter, there will be 120 exposures per second. The length of time of each exposure is determined by the width of the slot made by the inner and outer shutters on the film side of the shutter. By means to be described, the exposure time may be varied by changing the relative positions of the shutters to increase or decrease the slot opening at the film without altering the speed differential between the concentric shutters.

The outer shutter 36 is rotated at four-fifths the angular speed of the inner shutter 33, that is, while the inner shutter turns through 90 degrees, the outer shutter turns through 72 degrees. Thus, for a complete revolution of the inner shutter through 360 degrees, the outer shutter turns through 288 degrees.

Referring to Figs. 9A to 9D inclusive, the relative positions of the inner and outer shutters for each of the four exposure periods during a complete revolution of the inner shutter, is diagrammatically illustrated. In these disclosures the arrow O indicates the direction of film travel while the arrow P indicates direction of rotation of the shutter. In Fig. 9A, the slot A in the outer shutter registers with slot B in the inner shutter on the lens side of the shutter mechanism while the slot E in the outer shutter and the slot F in the inner shutter form a smaller exposure opening on the film side of the shutter mechanism. In Fig. 9B, the slot B of the inner shutter has turned through 90 degrees and the slot A in the outer shutter through 72 degrees to bring the next succeeding slots I and H in each of the shutters in register on the lens side of the shutter mechanism. When the slot B in the inner shutter has turned through 180 degrees, as shown in Fig. 9C, it has advanced sufficiently ahead of the slot A in the outer shutter to form with it the narrow exposure opening in front of the framing aperture while the slots F and G are in register on the lens side of the shutter mechanism. In Fig. 9D, the slot B has advanced on the slot C, next succeeding the slot A in the outer shutter, and when this slot B rotates through 360 degrees, that is, when it again reaches the position as shown in Fig. 9A, it will be in register on the lens side of the shutter mechanism with the slot C in the outer shutter.

As the two shutters are continuously rotating, the width of the slit formed by the shutters varies slightly during exposure but this has no effect on the average time between frames. Variations in optical density from frame to frame might occur at very small exposure openings due to the inability of the mechanical drive coupling means between the shutters to maintain the speed differential between the shutters within the degree of accuracy required. However, at these very small exposure openings, the shutter is closed approximately 97½ per cent of the time so that any inaccuracy in the frames per second is negligible.

By means of this novel arrangement, the use of relatively small tubular type shutters is made possible which, in turn, permits of a substantial reduction in the size and cost of construction of a high speed camera designed to record a large number of narrow picture frames in close succession on a single piece of normal length film whereby the displacement-time and other characteristics of the moving object may be readily observed from a positive print of the exposure series.

As the film 20 is continuously driven past the exposure aperture 31, it will be in motion during each exposure. The use of optical flats 40 mounted in each of the slot openings in the inner shutter 35 to be rotatable therewith causes the image to sweep at the same average rate as the film to eliminate distortions due to relative motion between image and film in a manner well known in the field of continuous motion cameras. However, the continuously moving film moves a distance during each exposure which is so small that very little blurring would be observable on a film record recorded in a camera of this type without optical compensation. Furthermore, the motion of the film relative to the image is perpendicular to the direction of travel of the object being photographed and could, therefore, introduce no error in the measurement of the position of the object.

In order to obtain the maximum amount of light for each exposure, the axis of rotation of the shutter mechanism is displaced from the optical axis in the direction of film movement. As shown in Fig. 9A, the axis of rotation of the shutter mechanism is located on line 42, which is below the optical axis as represented by line 43, a distance sufficient to place the center of the registered slots A and B on the optical axis of the lens system.

Referring to Fig. 4, a synchronous, 1800 revolutions per minute motor 45 is fixedly mounted exteriorly of the camera housing 14. A motor start switch 46 and a jack 47 are provided on motor support panel 48. The jack receives the cable plug from a suitable source of power. Shaft 49 of the motor drives the inner tubular shutter 33 and is coupled thereto by a coupling comprising a disc 50 secured to shaft 49 and provided with a cut-out 51 and a disc 52, secured on shaft 53, and provided with an axially disposed pin 54 extending into the recess 51 in disc 50. Shaft 53 is rotatable in a bearing 55 in the camera housing 14. The inner shutter 35 is secured to the end of shaft 53 while the outer shutter 36 is rotatable on a fixed bearing surrounding this shaft.

The take-up reel 30 is driven from the motor of shaft 49 by means of a gear connection. A gear 56, secured to shaft 49, drives a gear 57 rotatably mounted on a fixed shaft 58. A unit comprising a gear 59 and one element 60 of a positive clutch, is rotatably mounted on take-up reel shaft 61. This shaft has secured thereto a gear 62 which, through gears 63, 64 and 65, drives a shaft 66 connected to an exteriorly mounted film footage indicator 67.

Shaft 61 receives its power from a positive clutch element 68 which is keyed thereto to be movable along the shaft to engage driven clutch element 60. A push button 69, manually operable from the exterior of the camera casing, is slidable in a bearing in the gear housing. The clutch element 68, while rotatable with respect to button 69, is movable toward and away from the clutch element 60 by axial movement of the button to produce engagement of the clutch elements and consequent rotation of the take-up reel 30. Clutch members 60 and 68 are normally held apart by a spring (not shown) so that in order to drive the take-up spool it is only necessary to press on the button 69 while the exposure is being made. As soon as the button is released the spring will disengage the clutch.

The gear ratio between the driving motor shaft and the take-up reel shaft is such that the take-up reel advances the film a distance equal to the height of one picture frame for each quarter revolution of the inner shutter 33. This rate of exposure for a frame height of .150 inch is equivalent to a linear film speed of approximately 18 inches per second. Since the rate of rotation of the take-up reel is constant when operating and the diameter of the film roll changes as the film winds thereon, there may result some irregularities of spacing between frames. However, while the picture frames may overlap slightly at the start and be spaced slightly toward the end, there will be no variation in the number of picture frames exposed per second.

The provision of the above described manually operable clutching means between the continuously operating motor and the film take-up reel, permits the use of only the amount of film required for a particular series of exposures by the over-all time of the series rather than by the uncontrolled exposure of a fixed amount of film, as is the case in cameras designed heretofore for the same purpose.

Referring now to Figs. 4 and 5, the means for obtaining and maintaining the speed differential between the inner and outer concentric shutters and the means for altering the phase relation between these elements to vary the exposure time of the shutter, will be described.

The inner shutter 33, which is driven by motor 45 through shaft 53, is provided with a shaft 53a at the end thereof opposite shaft 53. The outer concentric shutter 36 is secured to a hollow shaft 70, rotatable in a bearing 71. A gear 72 is mounted on the end of shaft 70. Shaft 53a extends through the hollow shaft 70 to the exterior of the camera casing beyond gear 72. A split lever arm 73 is clamped on the extension of the shaft 53a by means of a clamping screw 74 so that the arm is rotated with this shaft. A shaft 75 is rotatably mounted in one end of arm 73. Gears 76 and 77 are secured to this shaft 75 at opposite ends thereof, gear 76 being in mesh with gear 72.

A housing 78 for the gear assembly is secured to the camera housing 14. The side of housing 78 is provided with a plate 79 on which is placed a series of circularly arranged, spaced holes with accompanying indicia to indicate shutter exposure openings.

A shaft 80, axially aligned with shaft 53a, is rotatably mounted in a suitable bearing surface in the housing 78. A gear 81, meshing with gear 77, is secured to shaft 80. The other end of the shaft 80 has secured thereto a hub element 82 from which extends a lever arm 83 provided with a knob 84 having a pointed extension to be received by the holes in plate 79. The gear 81 is, therefore, normally fixed in position and may be rotated only by movement of the lever arm 83.

As the motor 45 rotates the inner shutter 33, it in turn, through the arm 73 and gears 72, 76, 77 and 81, causes the shaft 70 and outer shutter 36 to rotate. The ratio of the gear train is such that the outer drum will make four-fifths as many revolutions as the inner drum. In the camera disclosed, the normally stationary gear 81 is provided with 18 teeth, the gear 77 in mesh with gear 81 is provided with 45 teeth, the gear 76 with 21 teeth and the gear 72 on the inner shutter shaft is provided with 42 teeth. The arm 73, in rotating through a complete revolution, will rotate gear 76 to drive gear 70 but the gear 76, through its connection with gear 77 and stationary gear 81, will slip relative to arm 73 and shaft 53a two-fifths of a revolution or 8⅖ teeth. This action, therefore, causes gear 72 to be rotated through a complete revolution minus 8⅖ teeth which is one-fifth of the 42 teeth on this gear, resulting in four-fifths of a revolution of shaft 70 for every revolution of shaft 53a.

As mentioned above, the length of time of each exposure is determined by the width of the slit made by the inner and outer shutters on the film side of the shutter mechanism. The phase relation between the shutters may be varied to increase or decrease the exposure slot to increase or decrease the exposure time by rotating the stationary gear 81 by movement of arm 83 along the calibrated scale on plate 79. This adjustment changes the phase relation between the shutters but does not alter the speed differential therebetween and may be made while the camera is in operation. In the camera construction shown, the exposure time may be varied from $\frac{1}{10000}$ to $\frac{9}{10000}$ seconds as indicated on the scale in Fig. 8.

In the camera disclosed in the accompanying drawing, the inner shutter element is provided with four exposure slots and the outer shutter element has a greater odd number, or five equal sized exposure slots to produce four exposures per revolution of the inner shutter, or 120 exposures per second with the inner shutter rotating at 30 revolutions per second. It should be understood, however, that the number of exposures per second may be increased by providing a shutter mechanism having the inner shutter provided with a greater even number of exposure slots and an outer concentric shutter provided with a greater odd number of equal size exposure slots and rotating the concentric shutters in the same direction at angular speeds reciprocally related to the number of slots. The exposures per second could, for example, be increased to 180 by the provision of six exposure slots in the inner shutter and seven exposure slots in the outer shutter with the outer shutter rotating at six-sevenths the angular speed of the inner shutter. This would, of course, entail some increase in the diameter of the shutter elements.

The use of a synchronous motor as the driving source assures accurate and constant time interval between frames thereby eliminating the necessity for an auxiliary timing device associated with the shutter mechanism.

What is claimed is:

1. In combination with a camera having a lens system and means for moving a film through the optical axis of said lens system, of a light interrupting means disposed between said lens and said film, said light interrupting means comprising a pair of concentric tubular shutters containing dissimilar numbers of equal size exposure slots, and means producing rotation of said concentric shutters in the same direction at unequal angular speeds.

2. In a camera, the combination with a lens and an apertured film gate of means for advancing a film past the aperture in said gate, a light interrupting means between said lens and said exposure aperture comprising a pair of concentric tubular shutters containing dissimilar numbers of equal size exposure slots, and means for rotating said shutters in the same direction at angular speeds reciprocally related to said numbers of slots.

3. In a camera, the combination with a lens and an apertured film gate of means for advancing a film past the aperture in said gate, a light interrupting means between said lens and said gate comprising a first tubular shutter containing an even number of equal size exposure slots, a second tubular shutter concentric with said first shutter and containing a greater odd number of exposure slots equal in size to the slots in said first shutter, and means producing rotation of said concentric shutters in the same direction at unequal angular speeds.

4. A camera in accordance with claim 3 in which means associated with said shutter driving means is provided for altering the phase relations between said shutters without altering their speed differential.

5. In a camera, the combination of a lens and an apertured film gate of means for advancing a film past the aperture in said gate, a shutter mechanism disposed between said lens and said gate, said mechanism comprising a first tubular shutter having an even number of equal size exposure slots, a second tubular shutter concentric with said first shutter, said second shutter having a number of exposure slots greater by one than the number in said first shutter, and means for rotating said shutters in the same direction at unequal angular speeds, the initial phase relation between said shutters and the operating speed differential therebetween being such that for each exposure substantially the full slot opening is formed on the lens side of said shutter mechanism while a slot opening smaller than the full slot opening is formed on the film side of said shutter mechanism.

6. In a camera, the combination with a lens and an apertured film gate of means for advancing a film past the aperture in said gate, a shutter mechanism disposed between said lens and said gate, said mechanism comprising a pair of concentric tubular elements, one of said elements having four diametrically opposed slots of equal size, the other of said elements having five slots equal in size to the slots in said first element, and means producing rotation of said elements in the same direction with said five slotted element rotating at four-fifths the angular speed of said four slotted element.

7. In a camera, the combination with a lens and an apertured film gate of means for advancing a film past the aperture in said gate, a shutter mechanism disposed between said lens and said gate, said mechanism comprising a first tubular shutter having an even number of diametrically opposed exposure slots, a second tubular shutter having a number of exposure slots greater by one than the number in said first shutter element and of equal size, the initial phase relation between said elements being such that an exposure slot in said first element is in register with an exposure slot in said second element on the lens side of said mechanism, means for rotating said elements in the same direction with said second element rotating at a fraction of the angular speed of said first element, and means associated with said rotating means for changing the initial phase relation between said elements without altering the speed differential therebetween.

8. In a camera, the combination with a lens and an apertured film gate of means for advancing a film past the aperture in said gate, a light interrupting means comprising a first shutter element having an even number of exposure slots, a second concentric shutter element having a greater odd number of exposure slots, driving means producing rotation of said first shutter element, power transmitting means connecting said shutter elements to produce rotation of said second shutter element in the same direction at a speed differing from the speed of said first shutter element, said power transmitting means including a differential gear coupling one element of which is normally non-rotating and manually operable means producing limited rotation of said last-mentioned coupling element to alter the phase relation between said shutter elements.

9. In combination with a camera having a lens system and means for continuously advancing a film through the optical axis of said lens system, of a light interrupting means comprising a pair of concentric tubular shutters containing dissimilar numbers of equal size exposure slots, means producing rotation of said concentric shutters in the same direction at unequal angular speeds, and optical means mounted in one of said shutters to be rotatable therewith to produce movement of the image formed by said lens system in the direction of travel of said film.

10. In a camera, the combination with a lens and an apertured film gate of means for continuously advancing a film past the aperture in said gate, a light interrupting means between said lens and said gate comprising a first tubular shutter containing an even number of equal size exposure slots, a second tubular shutter concentric with said first shutter and containing a greater odd number of exposure slots equal in size to the slots in said first shutter, optical compensating means comprising a plurality of optical flats one of which is mounted in each of the exposure slots in said first shutter, and means producing rotation of said concentric shutters in the same direction at unequal angular speeds.

11. In combination with a camera having a lens and means for moving a film past said lens, of a light interrupting means between said lens and said film, said light interrupting means comprising a pair of concentric tubular shutters containing dissimilar numbers of exposure slots, and means producing rotation of said concentric shutters in the same direction at angular speeds reciprocally related to said numbers of slots.

12. In combination with a camera having a lens and means for moving a film past said lens, of a light interrupting means between said lens and said film, comprising a first tubular shutter containing an even number of exposure slots, a second tubular shutter concentric with said first shutter and containing a greater odd number of exposure slots, and means producing rotation of said concentric shutters in the same direction at unequal angular speeds.

13. In combination with a camera having a lens and means for moving a film past said lens, of a shutter mechanism comprising a pair of concentric tubular elements, one of said elements having four diametrically opposed slots, the other of said elements having five uniformly spaced slots, and means producing rotation of said elements in the same direction with the five slotted element rotating at four-fifths the angular speed of the four slotted element.

CLARENCE N. HICKMAN.

REFERENCES CITED

The following references are of record in the file of this patent:

UNITED STATES PATENTS

| Number | Name | Date |
|---|---|---|
| 1,098,370 | Donnelly | June 2, 1914 |
| 1,319,698 | DeBrayer | Oct. 28, 1919 |
| 1,414,942 | Gill | May 2, 1922 |
| 1,928,434 | Pomeroy et al. | Sept. 26, 1933 |
| 1,973,483 | Hughey | Sept. 11, 1934 |
| 2,083,646 | Fuller | June 15, 1937 |
| 1,329,688 | Voulgre | Feb. 3, 1920 |
| 1,501,842 | Fuda | July 15, 1924 |
| 2,257,100 | Belock | Sept. 30, 1941 |
| 2,288,079 | Fitz | June 30, 1942 |

FOREIGN PATENTS

| Number | Country | Date |
|---|---|---|
| 515,509 | German | Jan. 7, 1931 |